United States Patent
Hintzer et al.

(10) Patent No.: US 8,623,957 B2
(45) Date of Patent: Jan. 7, 2014

(54) METHOD OF PREPARING FLUOROPOLYMERS BY AQUEOUS EMULSION POLYMERIZATION

(75) Inventors: Klaus Hintzer, Kastl (DE); Michael Juergens, Neuoetting (DE); Harald Kaspar, Burgkirchen (DE); Kai Helmut Lochhaas, Neuoetting (DE); André Streiter, Mühldorf am Inn (DE); Tilman C. Zipplies, Burghausen (DE); Werner Schwertfeger, Langgons (DE)

(73) Assignee: 3M Innovative Properties Company, St. Paul, MN (US)

( * ) Notice: Subject to any disclaimer, the term of this patent is extended or adjusted under 35 U.S.C. 154(b) by 511 days.

(21) Appl. No.: 12/673,241

(22) PCT Filed: Aug. 15, 2008

(86) PCT No.: PCT/US2008/073251
§ 371 (c)(1),
(2), (4) Date: Feb. 12, 2010

(87) PCT Pub. No.: WO2009/026123
PCT Pub. Date: Feb. 26, 2009

(65) Prior Publication Data
US 2011/0294951 A1    Dec. 1, 2011

(30) Foreign Application Priority Data

Aug. 23, 2007 (GB) .................................. 0716421.3

(51) Int. Cl.
*C08F 2/24* (2006.01)

(52) U.S. Cl.
USPC ............ 524/758; 524/777; 524/793; 524/794

(58) Field of Classification Search
USPC ................................. 524/758, 777, 793, 794
See application file for complete search history.

(56) References Cited

U.S. PATENT DOCUMENTS

| | | |
|---|---|---|
| 3,635,926 A | 1/1972 | Gresham et al. |
| 3,642,742 A | 2/1972 | Carlson |
| 3,855,191 A | 12/1974 | Doughty, Jr. et al. |
| 4,262,101 A | 4/1981 | Hartwimmer et al. |
| 4,439,385 A | 3/1984 | Kuhls et al. |
| 4,499,249 A | 2/1985 | Nakagawa et al. |
| 4,588,796 A | 5/1986 | Wheland |
| 4,777,304 A | 10/1988 | Schweighardt et al. |
| 4,861,845 A | 8/1989 | Slocum et al. |
| 5,530,078 A | 6/1996 | Felix et al. |
| 5,663,255 A | 9/1997 | Anolick et al. |
| 5,895,799 A | 4/1999 | Wu et al. |
| 6,686,427 B2 | 2/2004 | Katsurao et al. |
| 2006/0270864 A1 | 11/2006 | Sumida et al. |
| 2007/0004848 A1* | 1/2007 | Hintzer et al. ................ 524/544 |
| 2007/0015937 A1 | 1/2007 | Hintzer et al. |

FOREIGN PATENT DOCUMENTS

| | | |
|---|---|---|
| DE | 2 000 830 | 9/1970 |
| EP | 0 190 393 | 8/1986 |
| EP | 0 253 529 | 1/1988 |
| EP | 0 250 767 | 7/1988 |
| EP | 0 649 863 | 4/1995 |
| EP | 1 067 146 | 1/2001 |
| EP | 1 245 596 | 2/2002 |
| EP | 1245596 A1 * | 10/2002 |
| EP | 0 964 009 | 7/2003 |
| GB | 1 281 822 | 7/1972 |
| JP | 46-11031 | 3/1971 |
| JP | 58-189210 | 11/1983 |
| JP | S63-086742 | 4/1988 |
| JP | 2002-220403 | 8/2002 |
| JP | 2005-29527 | 3/2005 |
| WO | WO 02/44226 | 6/2002 |

OTHER PUBLICATIONS

Harrison, D. et al., "Polycyclic Fluoroaromatic Compounds—III: Octafluoroacenaphthylene, and Decafluoro-indane, -acenaphthene, -anthracene, and -pyrene," *Tetrahedron* vol. 19 (1963) p. 1893-1901.
International Search Report and Written Opinion PCT/US2008/073251, dated Feb. 24, 2009.

* cited by examiner

*Primary Examiner* — Peter D. Mulcahy
*Assistant Examiner* — Henry Hu
(74) *Attorney, Agent, or Firm* — Julie Lapos-Kuchar

(57) ABSTRACT

Method of making fluoropolymers by emulsion polymerization of one or more fluorinated monomers in an aqueous phase in the presence of a fluorinated emulsifier, said method comprises adding a doping agent in a weight ratio with respect to the emulsifier of from about 1:2 to about 1:20, said doping agent has a melting point of equal or less than 30° C. and a boiling point of at least about 100° C. and is selected from the group consisting of fluorinated cyclic hydrocarbons, fluorinated polyoxyalkenes, fluorinated alkenes and fluorinated polyoxyalkenes.

11 Claims, No Drawings

METHOD OF PREPARING FLUOROPOLYMERS BY AQUEOUS EMULSION POLYMERIZATION

CROSS REFERENCE TO RELATED APPLICATIONS

This application is a national stage filing under 35 U.S.C. §371 of PCT/US2008/073251, filed Aug. 15, 2008, which claims priority to Great Britain Application No. 0716421.3, filed Aug. 23, 2007, the disclosure of which is incorporated by reference in its/their entirety herein.

FIELD

The present invention relates to an aqueous emulsion polymerization of fluorinated monomers to make fluoropolymers, i.e. polymers that have a partially or fully fluorinated backbone. In particular, the present invention relates to an aqueous emulsion polymerization process using an emulsifier and an organic fluorinated liquid by which large particle sizes of the polymers are generated at short run times.

BACKGROUND

Commonly known or commercially employed fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF). Commercially employed fluoropolymers also include fluoroelastomers. Fluoropolymers and their applications are further described in "Modern Fluoropolymers", edited by John Scheirs, John Wiley & Sons Ltd., 1997, or in "Fluoroplastics", Ebnesajjad, Sina, Plastics Design Library, Norwich, N.Y., USA, 2003. Preparing such fluoropolymers generally involves the polymerization of gaseous monomers, i.e. monomers that under ambient conditions of temperature and pressure are present as a gas. Several methods are known to produce the fluoropolymers. Such methods include suspension polymerization (disclosed in e.g. U.S. Pat. No. 3,855,191, U.S. Pat. No. 4,439,385 and EP 649 863), aqueous emulsion polymerization (disclosed in e.g. U.S. Pat. No. 3,635,926 and U.S. Pat. No. 4,262,101), solution polymerization (disclosed in e.g. in U.S. Pat. No. 3,642,742, U.S. Pat. No. 4,588,796 and U.S. Pat. No. 5,663,255); polymerization using supercritical liquids (disclosed in e.g. JP 46011031 and EP 964 009) and polymerization in the gas phase (disclosed in e.g. U.S. Pat. No. 4,861,845).

Currently, the most commonly employed polymerization methods for fluoropolymers include suspension polymerization and especially aqueous emulsion polymerization. In aqueous emulsion polymerizations the polymerization is carried out in the presence of a fluorinated emulsifier, which is generally used to accelerate the reaction rate and to stabilize the polymer particles formed.

However, fluorinated emulsifiers are expensive materials and attempts have been made to reduce their use. Certain non-emulsifying fluorinated compounds, so-called 'doping agents', have been added to the reaction mixture which also increase the reaction rate allowing for reducing the amounts of emulsifiers. However, the presence of doping agents also leads to a reduction of the particle sizes of the fluoropolymers formed as is shown in EP 1 245 596. For example, the particles of fluoropolymers at a given solid content are smaller when doping agents are used compared to the same reaction carried out without doping agents. For example, in U.S. Pat. No. 5,895,799, aliphatic or aromatic perfluorinated hydrocarbon used as doping agents have been reported to lead to fluoropolymers having particle sizes of 80 nm or less when used in a weight ratio with respect to the emulsifier of approximately 1:1. Doping agents in the form of perfluoropolyethers have been reported to lead to particles of less than about 70 nm (EP 250 767).

The generation of small fluoropolymer particles may be desirable in many applications and due to their known effect of reducing the particles sizes doping agents have been employed for this purpose.

However, in some applications, the formation of larger rather than smaller fluoropolymer particles is desired. Such applications include, for example, those where thick fluoropolymer coatings are required. Thick coatings can be prepared with fewer coating steps using fluoropolymers with large particle sizes. In other applications bimodal particle size distributions, e.g. a fluoropolymer composition where one polymer population has small particles sizes and another polymer population has large particle sizes may be desirable, because such dispersions can lead to particularly dense coatings.

Therefore it would be desirable to provide a process for the preparation of fluoropolymers by aqueous emulsion polymerization using doping agents by which at a given reaction time or solid content larger polymer particles can be formed. It is further desirable that the process can be practiced with commonly employed fluorinated emulsifiers.

SUMMARY OF THE INVENTION

In the following there is provided a method of making fluoropolymers through emulsion polymerization of one or more fluorinated monomers in an aqueous phase in the presence of a fluorinated emulsifier.

In particular there is provided a method of increasing the particle sizes of fluoropolymers at a given reaction in the emulsion polymerizations of one or more fluorinated monomers.

There is also provided a method of controlling the particle sizes of fluoropolymers in aqueous emulsion polymerizations.

Therefore, there is provided a method of making fluoropolymers by emulsion polymerization of one or more fluorinated monomers in an aqueous phase in the presence of a fluorinated emulsifier, said method comprises adding a doping agent in a weight ratio with respect to the emulsifier of from about 1:2 to about 1:20, said doping agent has a melting point of equal or less than 30° C. and a boiling point of at least about 100° C. and is selected from the group consisting of
(i) fluorinated cyclic hydrocarbons,
(ii) fluorinated polyoxyalkenes of the formula

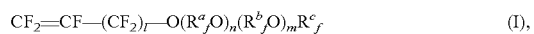

(iii) fluorinated alkenes of the formula

(iv) fluorinated polyoxyalkanes of the formula

wherein
$R^a_f$ and $R^b_f$ are different perfluoroalkyl groups of 3 to 6 C-atoms,
l is 0 or 1, m and n are independently 0 to 10 and n+m is >2 or >3, $R^c_f$ is a perfluoroalkyl group of 1 to 6 C-atoms,
$R^d_f$ and $R^e_f$ are independently fluorinated alkyl groups of 1 to 6 C-atoms,
$R^f_f$ is F or a fluorinated alkyl group of 1 to 6 C-atoms,
$R^g_f$ and $R^i_f$ are independently fluorinated alkyl groups of 2 to 5 C-atoms and
$R^h_f$ is a branched perfluorinated alkyl group of 2 to 4 C-atoms.

DETAILED DESCRIPTION OF THE INVENTION

Doping Agents

The doping agent is a fluorinated compound that is liquid under the polymerization conditions. Typically, the doping agent has a melting point of equal or less than 30° C., preferably equal or less than 25° C. and a boiling point of at least about 100° C., preferably at least about 150° C., more preferably at least about 160° C. Preferably, the doping agent has a boiling point of less than 350, less than 300, more preferably less than 260° C. The melting and boiling points referred to herein are with respect to ambient pressure (1 atm). The doping agent may comprise at least 6 and up to 30 or up to 20 carbon atoms. The doping agent may be selected from the group consisting of fluorinated cyclic hydrocarbons, fluorinated non-cyclic hydrocarbons, fluorinated polyoxyalkenes and fluorinated polyoxyalkanes.

The doping agent may not be substituted or may be substituted with one or more, identical or different partially fluorinated or perfluorinated alkyl, alkoxy or polyoxyalkyl residues. Preferably, the doping agent is not telogenic.

By "perfluorinated" or "perfluorinated compound" is meant that all hydrogen atoms attached to a carbon in the corresponding aliphatic or aromatic hydrocarbon have been replaced by a fluorine atom, whereas "partially fluorinated" means only some of the hydrogen atoms have been replaced by fluorine. For example, a "perfluorinated ethylene" as used herein denotes a compound of the formula $F_2C=CF_2$, which would belong to the class of 'perfluorinated hydrocarbons' in the meaning as used herein.

A compound having the prefix "perfluoro" as used herein denotes a perfluorinated compound, for example a 'perfluoromethyl residue' represents $-CF_3$.

A "partially fluorinated ethylene" would represent $FHC=CF_2$, $CFH=CFH$, $FHC=CH_2$. These compounds would belong to the class of 'partially fluorinated' hydrocarbons.

By "fluorinated" is meant that the compound contains fluorine but may be perfluorinated or partially fluorinated.

Unless stated otherwise, the terms 'perfluorinated', 'fluorinated' or 'partially fluorinated' 'hydrocarbons' as used herein excludes the presence of atoms other than C, F and H.

The preparation of various substituted and non-substituted fluorinated compounds has been described, for example in German Pat Appl. DE 2 000 830, U.S. Pat. No. 4,777,304 and European Pat. Appl. Nos 0 253 529 and 0 190 393 and in Tetrahedron, 19, 1893 (1963). Perfluorinated liquids are also commercially available, for example, from 3M St. Paul, Minn., USA.

Cyclic Doping Agents

The doping agent may be a partially fluorinated or perfluorinated cycloalkane or an arene which may be non-substituted or substituted as described above. The cycloalkanes may be saturated or unsaturated. Preferably the doping agent is a perfluorinated cycloalkane or a perfluorinated arene, which may be monocyclic, bicyclic, tricyclic or polycyclic and which may be non-substituted or substituted as described above.

Examples of suitable perfluorinated arenes include but are not limited to octafluoronaphthalene, octafluorotoluene, hexafluorobenzene.

Particular examples of suitable fluorinated tricyclic alkanes include but are not limited to perfluoroperhydrophenantrene (C14F24), perfluoroperhydrofluorene (C13F22).

Particular examples of suitable fluorinated bicyclic hydrocarbons include but are not limited to perfluoroperhydronapthalines, such as for example perfluoro decalin (C10F18), perfluoro methyl decalin (C11F20), perfluoro butyl decalin (C14F26).

Particular examples of suitable monocyclic hydrocarbons include but are not limited to perfluorodimethylcyclohexane (C8F16), perfluoromethylcyclohexane (C7F14), perfluorodimethylcyclobutane (C6F12).

The cyclic doping agent may have a molecular weight of less than about 1000 g/mol or from about 500 to about 800 g/mol.

Non-Cyclic Unsaturated Doping Agents

The doping agent may also be an unsaturated perfluoroether or perfluoropolyether having the general formula

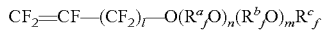

$$CF_2=CF-(CF_2)_l-O(R^a_fO)_n(R^b_fO)_mR^c_f$$

wherein $R^a_f$ and $R^b_f$ are different linear or branched perfluoroalkylene groups of 3 to 6 carbon atoms,
l is either 0 or 1,
m and n are independently 0 to 10 and the sum of n and m is greater than 2 or greater than 3, and
$R^c_f$ is a linear or branched perfluoroalkyl group of 1 to 6 carbon atoms.

Particular examples include but are not limited to
CF3-CF2-CF2-(O—CF(—CF3)-CF2)2-O—CF=CF2 (PPVE-3),
CF3-CF2-CF2-(O—CF(—CF3)-CF2)3-O—CF=CF2 (PPVE-4),
CHF2-CF2-CF2-(O—CF(—CF3)-CF2)1-O—CF=CF2 (HPPVE-2),
CHF2-CF2-CF2-(O—CF(—CF3)-CF2)2-O—CF=CF2 (HPPVE-3).

Preferably, the unsaturated perfluoroethers do not incorporate into the polymer, or at least not at runtimes of up to 300 minutes.

The doping agent may also be a perfluorinated branched alkene corresponding to the general formula

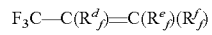

$$F_3C-C(R^d_f)=C(R^e_f)(R^f_f)$$

wherein
$R^d_f$ and represent $R^e_f$ independently from each other fluorine or a perfluorinated or partially fluorinated, linear or branched alkyl group, preferably a group having from 1 to 6, preferably 1 to 3, carbon atoms and
$R^f_f$ represents a perfluorinated, linear or branched alkyl group of 1 to 6 carbon atoms, preferably a methyl, ethyl, propyl or isopropyl group.

Particular examples include but are not limited to
C(—CF3)(-CF3)=CF—CF2-CF3 (HFP-Dimer),
C(—CF3)2=C(—CF2-CF3)(-CF(—CF3)2) (HFP-Trimer).

The linear unsaturated doping agents may have a molecular weight of less than 1000 g/mol or less than about 500 g/mol or less than about 450 g/mol.

Non-Cyclic Saturated Doping Agents

The doping agent may further be a saturated fluorinated polyether, i.e. a polyoxyalkane, having the general formula

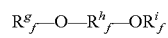

$$R^g_f-O-R^h_f-OR^i_f$$

wherein
$R^g_f$ and $R^i_f$ can be different or identical and represent partially fluorinated or perfluorinated, linear or branched alkyl groups comprising from 2 to 5 carbon atoms and $R^h_f$ represents a branched perfluorinated alkylene group having from 2 to 4 carbon atoms.
Particular examples include but are not limited to
CHF2-CF2-CF2-O—CF(—CF3)-CF2-O—CFH—CF3 (HTFEE-2),
CHF2-CF2-CF2-O—CF(—CF3)-CF(—CF3)-O—CF2-CF2-CHF2,
CF3-CF2-CF2-O—CF(—CF3)-CF(—CF3)-O—CF2-CF2-CF3.

The saturated doping agents may have a molecular weight of less than 1000 g/mol or less than about 500 g/mol or less than about 450 g/mol.

Fluorinated Emulsifiers

The process of the invention has the advantage that is compatible with commonly employed fluorinated surfactants such as perfluorooctanoic acid and salts thereof and perfluorooctane sulfonic acid and salts thereof. Furthermore, the process can be run with low amounts of emulsifier and still yields desirable polymer solids showing high dispersion stability with reduced coagulum.

Generally, the process can be carried out with amounts of fluorinated emulsifiers of less than 5% or less than 1% by weight based on the aqueous phase of the dispersion. Typical amounts of fluorinated emulsifier are from 0.02 to 0.9% wt.

The methods provided herein are not restricted to specific fluorinated emulsifiers. Typical fluorinated emulsifiers that may be used include those having the formula:

$$Y—Rf-Z-M \quad (IV)$$

wherein
Y represents hydrogen, Cl or F;
Rf represents a linear or branched perfluorinated alkylene having 4 to 10 C-atoms;
Z represents $COO^-$ or $SO_3^-$ and
M represents a monovalent cation such as an alkali metal ion or an ammonium ion.

Other fluorinated emulsifiers which may be used in aqueous polymerization of fluoropolymers include fluorinated carboxylic acids or salts thereof corresponding to the general formula:

$$[R_f—O-L-COO^-]_i X^{i+} \quad (V)$$

wherein
L represents a linear partially or fully fluorinated alkylene group or an aliphatic hydrocarbon group,
$R_f$ represents a linear partially or fully fluorinated aliphatic group or a linear partially or fully fluorinated aliphatic group interrupted with one or more oxygen atoms,
$X^{i+}$ represents a cation having the valence i and i is 1, 2 or 3. Examples of cations include $H^+$, ammonium, monovalent metal cations, divalent metal cations and trivalent cations. Typical cations are $H^+$, $K^+$, $Na^+$, and $NH_4^+$.

For the sake of convenience, the term 'fluorinated carboxylic acid' is hereinafter used to indicate the free acid as well as salts thereof. Generally, the fluorinated carboxylic acid are low molecular weight compounds, for example a compound having a molecular weight for the anion part of the compound of not more than 1000 g/mol, typically not more than 600 g/mol and in particular embodiments, the anion of the fluorinated carboxylic acid may have a molecular weight of not more than 500 g/mol.

Fluorinated emulsifiers of this type and their preparation are described in great detail in U.S. Publ. No. 2007/0015937 by Hintzer et al, which is incorporated herein by reference.

Specific examples of compounds according to formula (V) include the following:

$R_f$—O—CHF—COOH:
$C_3F_7$—O—CHF—COOH, $CF_3$—O—$CF_2CF_2$—$CF_2$—O—CHF—COOH, $CF_3CF_2CF_2$—O—$CF_2CF_2$—$CF_2$—O—CHF—COOH, $CF_3$—O—$CF_2$—$CF_2$—O—CHF—COOH, $CF_3$—O—$CF_2$—O—$CF_2$—$CF_2$—O—CHF—COOH, $CF_3$—(O—$CF_2$)$_2$—O—$CF_2$—$CF_2$—O—CHF—COOH, $CF_3$—(O—$CF_2$)$_3$—O—$CF_2$—$CF_2$—O—CHF—COOH;

$R_f$—O—CHF—$CF_2$—COOH:
$CF_3$—O—CHF—$CF_2$—COOH, $CF_3$—O—$CF_2$—$CF_2$—O—CHF—$CF_2$—COOH, $CF_3$—$CF_2$—O—CHF—$CF_2$—COOH, $CF_3$—O—$CF_2$—$CF_2$—$CF_2$—O—CHF—$CF_2$—COOH, $CF_3$—O—$CF_2$—O—$CF_2$—$CF_2$—O—CHF—$CF_2$—COOH, $CF_3$—(O—$CF_2$)$_2$—O—$CF_2$—$CF_2$—O—CHF—$CF_2$—COOH, $CF_3$—(O—$CF_2$)$_3$—O—$CF_2$—$CF_2$—O—CHF—$CF_2$—COOH;

$R_f$—O—$CF_2$—CHFCOOH:
$CF_3$—O—$CF_2$—CHF—COOH, $C_3F_7$—O—$CF_2$—CHF—COOH, $CF_3$—O—$CF_2$—$CF_2$—O—$CF_2$—CHF—COOH, $CF_3$—O—$CF_2$—O—$CF_2$—$CF_2$—O—$CF_2$—CHF—COOH, $CF_3$—(O—$CF_2$)$_2$—O—$CF_2$—$CF_2$—O—$CF_2$—CHF—COOH, $CF_3$—(O—$CF_2$)$_3$—O—$CF_2$—$CF_2$—O—$CF_2$—CHF—COOH;

$R_f$—O—$CF_2$—CHF—$CF_2$COOH:
$CF_3$—O—$CF_2$—CHF—$CF_2$—COOH, $C_2F_5$—O—$CF_2$—CHF—$CF_2$—COOH, $C_3F_7$—O—$CF_2$—CHF—$CF_2$—COOH, $CF_3$—O—$CF_2$—$CF_2$—$CF_2$—O—$CF_2$—CHF—$CF_2$—COOH, $CF_3$—O—$CF_2$—O—$CF_2$—$CF_2$—O—$CF_2$—CHF—$CF_2$—COOH, $CF_3$—(O—$CF_2$)$_2$—O—$CF_2$—$CF_2$—O—$CF_2$—CHF—$CF_2$—COOH, $CF_3$—(O—$CF_2$)$_3$—O—$CF_2$—$CF_2$—O—$CF_2$—CHF—$CF_2$—COOH;

$R_f$—(O)$_m$—CHF—$CF_2$—O—(CH$_2$)$_n$—COOH n=1, 2 or 3; m=0 or 1:
$CF_3$—O—CHF—$CF_2$—O—$CH_2$—COOH, $CF_3$—O—$CF_2$—$CF_2$—$CF_2$—O—CHF—$CF_2$—O—$CH_2$—COOH, $C_3F_7$—O—CHF—$CF_2$—O—$CH_2$—COOH, $C_3F_7$—O—CHF—$CF_2$—O—$CH_2$—$CH_2$—COOH, $C_3F_7$—O—$CF_2$—$CF_2$—O—CHF—$CF_2$—OCH$_2$COOH, $C_3F_7$—O—$CF_2$—$CF_2$—$CF_2$—O—CHF—$CF_2$—OCH$_2$COOH, $C_3F_7$—O—$CF_2$—CHF—$CF_2$—OCH$_2$COOH, $CF_3$—CHF—$CF_2$—O—$CH_2$COOH, $C_3F_7$—$CF_2$—CHF—$CF_2$—OCH$_2$—COOH, $CF_3$—O—$CF_2$—$CF_2$—O—$CH_2$—COOH, $CF_3$—O—$CF_2$—$CF_2$—$CF_2$—O—$CF_2$—$CF_2$—O—$CH_2$—COOH, $C_3F_7$—O—$CF_2$—$CF_2$—O—$CH_2$—COOH, $C_3F_7$—O—$CF_2$—$CF_2$—O—$CH_2$—$CH_2$—COOH, $C_3F_7$—O—$CF_2$—$CF_2$—O—$CF_2$—OCH$_2$COOH, $C_3F_7$—O—$CF_2$—$CF_2$—O—$CF_2$—$CF_2$—OCH$_2$COOH, $C_3F_7$—O—$CF_2$—$CF_2$—$CF_2$—OCH$_2$COOH, $C_4F_9$—O—$CH_2$—COOH, $C_4F_9$—O—$CH_2$—$CH_2$—COOH, $C_3F_7$—O—$CH_2$COOH, $C_6F_{13}$—OCH$_2$—COOH, $R_f$—O—$CF_2$—$CF_2$—COOH, $CF_3$—O—$CF_2$—$CF_2$—COOH, $C_2F_5$—O—$CF_2$—$CF_2$—COOH, $C_3F_7$—O—$CF_2$—$CF_2$—COOH, $C_4F_9$—O—$CF_2$—$CF_2$—COOH, $R_f$—(O—$CF_2$)$_u$—O—$CF_2$—COOH with u being 1, 2, or 3:
$CF_3$—(O—$CF_2$)$_3$—O—$CF_2$—COOH, $CF_3$—(O—$CF_2$)$_2$—O—$CF_2$—COOH, $CF_3$—(O—$CF_2$)$_l$—O—$CF_2$—COOH;

$R_f$—(O—$CF_2$—$CF_2$)$_k$—O—$CF_2$—COOH with k being 1, 2 or 3:
$CF_3$—(O—$CF_2$—$CF_2$)$_l$—O—$CF_2$—COOH, $C_2F_5$—(O—$CF_2$—$CF_2$)$_l$—O—$CF_2$—COOH, $C_3F_7$—(O—$CF_2$—$CF_2$)$_l$—O—$CF_2$—COOH, $C_4F_9$—(O—$CF_2$—$CF_2$)$_l$—O—$CF_2$—COOH, $C_2F_5$—(O—$CF_2$—$CF_2$)$_2$—O—$CF_2$—

COOH, CF$_3$—(O—CF$_2$—CF$_2$)$_2$—O—CF$_2$—COOH, C$_3$F$_7$—(O—CF$_2$—CF$_2$)$_2$—O—CF$_2$—COOH, C$_4$F$_9$—(O—CF$_2$—CF$_2$)$_2$—O—CF$_2$—COOH;
R$_f$—O—CF$_2$—COOH:
C$_3$F$_7$—O—CF$_2$—COOH, CF$_3$—O—CF$_2$—CF$_2$—CF$_2$—O—CF$_2$—COOH;
CF$_3$—CHF—O—(CF$_2$)$_o$—COOH with o being an integer of 1, 2, 3, 4, 5 or 6:
CF$_3$CFH—O—(CF$_2$)$_3$—COOH, CF$_3$CFH—O—(CF$_2$)$_5$—COOH
CF$_3$—CF$_2$—O—(CF$_2$)$_o$—COOH with o being as above:
CF$_3$—CF$_2$—O—(CF$_2$)$_3$COOH, CF$_3$—CF$_2$—O—(CF$_2$)$_5$COOH It is understood that while the above list of compounds only lists the acids, the corresponding salts, in particular the NH$_4{}^+$, potassium, sodium or lithium salts can equally be used.

Polymerization

The aqueous emulsion polymerization is carried out in the presence of doping agent and emulsifier.

The doping agent is present in a weight ratio of doping agent to emulsifier of from about 1:2 to 1:20, preferably from about 1:5 to about 1:15.

Preferably, at least part of the fluorinated emulsifier used in the aqueous emulsion polymerization is added to the aqueous phase in the form of a (preferably aqueous) mixture. The mixture may be prepared by mixing a (preferably aqueous) solution of the fluorinated emulsifier with the doping agent. Preferably, the mixture is an emulsion, more preferably an emulsion having an average droplet size of less than 1000 nm. Such emulsions may be prepared by using an emulsifying apparatus, for example those obtainable from Microfluidics (Microfluidizer® High Shear Processors, Microfluidics, Lampertsheim, Germany). Another way to prepare suitable emulsions is by thermal treatment of a (preferably aqueous) mixture of emulsifier and doping agent followed, if necessary, by filtration.

The doping agent can be added at various points during the initial stage of the polymerization. The person skilled in the art can readily determine the most appropriate point for the addition. For example, the doping agent can be added prior to the evacuation of air from the reaction vessel or after evacuation of air from the reaction vessel. The doping agent may also be added after increasing the pressure in the reaction vessel with gaseous fluorinated monomers. The doping agent and emulsifier may be present for example prior to commencement of the polymerization, i.e. generally before the initiator is added to the polymerization. Alternatively, the doping agent and emulsifier may be added simultaneously or even shortly (for example until about 2 minutes) after addition of initiator to the reaction vessel. Preferably, the doping agent will be added to the reaction vessel over a short period of time, for example 5 to 10 minutes.

The process generally leads to the generation of larger particles compared to the same polymerization reaction carried without doping agents at the same reaction time (run time) or for the same solid content, for example when a solid content of 10% wt based on the total weight of the dispersion has been reached.

Typically, at a solid content of 10% wt based on the total amount of the dispersion, polymer particle sizes (average size as measured by dynamic light scattering) of more than 100 nm or more than 130 nm or from 120 to about 350 nm may be generated by this process.

Therefore comparatively large particles can be generated directly by aqueous emulsion polymerization, i.e. without having to take recourse to seed polymerization or core/shell polymerization techniques for obtaining particles having an average size of greater than about 100 or greater than about 130 nm.

The methods provided herein can be efficiently performed under standard conditions for aqueous emulsion polymerizations but can also be carried out under microemulsion conditions.

The aqueous emulsion polymerization process is generally conducted in the commonly known manner. Preferred polymerization temperatures are 10° to 100° C., preferably 20° C. to 90° C. and a pressure of 4 to 30 bar, in particular 8 to 20 bar.

The aqueous emulsion polymerization process can be used to produce any of the known fluoropolymers, i.e. polymers that have a partially or fully fluorinated backbone. In particular, the aqueous emulsion polymerization process can be used to produce homo- and copolymers of gaseous fluorinated monomers such as tetrafluoroethylene, vinylidene fluoride and chlorotrifluoroethylene. Suitable comonomers include fluorinated monomers such as hexafluoropropene, perfluoro vinyl ethers including perfluoroalkyl vinyl ethers such as perfluoromethyl vinyl ether and perfluoro-n-propylvinyl ether and perfluoroalkoxy vinyl ethers such as those corresponding to the general formula: CF$_2$=CFO(R$_f'$O)$_n$(R'$_f$O)$_m$R''$_f$ wherein R$_f$ and R'$_f$ are different linear or branched perfluoroalkylene groups of 2-6 carbon atoms, m and n are independently 0-10 and the sum of n and m is at least 1, and R''$_f$ is a perfluoroalkyl group of 1-6 carbon atoms. Non-fluorinated monomers that can be used as comonomers include e.g. ethylene and propylene. The process of the invention can be used to produce polytetrafluoroethylene, fluoroelastomers as well as fluorothermoplasts.

Preferably, the process is used to prepare polytetrafluoroethylene homopolymers or polytetrafluoroethylene copolymers. Preferably, the copolymer content is below 15% wt or below 10% wt based on the total amount of monomers.

The polymerization is generally initiated through the use of free radical generating initiators. As initiators, one can use any of the known initiators commonly employed in the polymerization of TFE. For example peroxides can be used as free radical initiators. Specific examples of peroxide initiators include, hydrogen peroxide, sodium or barium peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate, a combination of peroxodisulphate and hydrazine or azodicarboxamide (including salts thereof, preferably alkali or ammonium salts). Further initiators that can be used are ammonium-alkali- or earth alkali salts of permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization. Accelerators such as for example water soluble salts of iron, copper and silver may preferably be added, in particular when redox systems are used as initiators.

The aqueous emulsion polymerization system may further comprise other materials, such as buffers and, if desired, complex-formers or chain-transfer agents.

The achievable solids content of the polymer dispersion is typically from 5 to 40% without any major coagulum. The resultant dispersions are highly stable and generally have an average particle diameter of more than 80 nm, or more than 120 nm or even from and exceeding 150 nm. Typically average particle sizes from 140 to 350 nm can be achieved.

Experimental Part

The following examples further illustrate the invention without the intention however to limit the invention thereto. All parts and percentages are by weight unless indicated otherwise.
Materials:
APFO: $C_7F_{15}COONH_4$ (FC1015, 3M, St. Paul, Minn., USA);
231: $CF_3—O—(CF_2)_3—O—CHF—CF_2—COONH_4$ (US2007/0142541);
131: $CF_3—O—(CF_2)_3—O—CF_2—COONH_4$ (US2007/0015864);
Flutec PP11: perfluoroperhydrophenanthrene (F2 Chemicals Ltd, Lea Town, Lancashire, UK);
PPHF: perfluoroperhydrofluorene (F2 Chemicals Ltd, Lea Town, Lancashire, UK);
FC70: perfluorotripentylamine (3M, St. Paul, Minn., USA);
HOSTINERT 216: perfluoro-5,8,9,12-tetramethyl-4,7,10,13-tetraoxahexadecane (U.S. Pat. No. 5,167,451);
PPVE-3: (U.S. Pat. No. 3,250,808);
HFP-oligomers: Chem. Ber. 106, 2950-2959 (1973), Tetrahedron Letters No. 24, 2129-2132, 1974; J Organomet Chem 218, 169, 1981.
Particle Size The latex particle size was determined by dynamic light scattering with a Malvern Zetasizer 1000 HAS in accordance to ISO/DIS 13321. Prior to measurements, the polymer latices were diluted with 0.001 mol/L KCl-solution; the measurement temperature was 25° C. The reported average value is the Z-average particle diameter (median particle size, $d_{50}$).
Droplet Size The median droplet size can be determined using an Autosizer 2C, from Malvern by the photon correlation spectroscopy method to ISO 13321.
Solid Content Solid content was determined by subjecting the latex sample to a temperature up to 250° C. for 30 min (see ISO 12086).
General Polymerization The polymerization experiments were performed in a 40-l-kettle equipped with an impeller agitator and a baffle. The kettle was charged with 30 l of deionized water and set of 35° C.; the kettle was evacuated repeatedly to remove oxygen; Agitation speed was set to 165 rpm. The oxygen free kettle was charged with a freshly prepared mixture comprising doping agent and emulsifier. The mixture was prepared by adding the doping agent to a 30% wt aqueous solution of fluorinated emulsifier (in amounts as specified in tables 1-3) under stirring (KPM stirrer, 400 rpm), heating to a temperature of 87° C. for 8 hours under stirring and cooling down to room temperature under stirring.

The following materials were added to reaction mixture: 0.5 mol of a solution containing 40 mg of copper sulphate pentahydrate and 1 mg of concentrated sulphuric acid. The reactor was then pressurized with tetrafluoroethylene (TFE) to 0.2 Pa after which 47 g HFP. The kettle was then set to 1.5 MPa using TFE. 100 ml of an aqueous initiator solution containing 140 mg of sodium disulfite were pumped into the reactor followed by 100 ml of an aqueous solution containing 340 mg of ammonium peroxodisulfate.

A pressure drop indicates the start of the polymerization reaction. 3.2 kg of TFE were continuously feed to the polymerization such that a polymerization pressure of 1.5 MPa was maintained. The time necessary to feed in this amount of TFE under these conditions was measured (runtime). After 3.2 kg of TFE had been fed, the polymerization reaction was stopped by shutting the monomer valve and releasing the pressure. This process gave polymer dispersions with a solid content between 8 and 10%.

In experiments 1 to 3, the polymerizations were carried out without addition of doping agent. The characteristics of the polymer latices obtained are shown in table 1.

Experiments 4 and 5 are also comparative examples. Doping agents as identified in table 2 were added in amounts as given in table 2 leading to the formation of small polymer particles.

In experiments 6 to 11 the doping agents as identified in table 3 were added in the amounts as shown in table 3. The characteristics of the polymer latices obtained are shown in table 3.

TABLE 1

Comparative experiments 1 to 3

| Experiment | Doping agent (g) | Emulsifier (g)* | Solids (% wt)** | $d_{50}$ (nm) | Runtime (min)*** |
|---|---|---|---|---|---|
| 1 | — | APFO (35.4) | 9.4 | 125 | 100 |
| 2 | — | 231 (32.3) | 9.4 | 128 | 90 |
| 3 | — | 131 (32.3) | 9.3 | 113 | 87 |

TABLE 2

Comparative experiments 4 and 5

| Experiment | Doping agent (g) | Emulsifier (g)* | Solids (% wt)** | $d_{50}$ (nm) | Runtime (min)*** |
|---|---|---|---|---|---|
| 4 | FC70 (1.64) | 231 (32.8) | 9.5 | 79 | 88 |
| 5 | Hostinert 216 (2.37) | 231 (32.3) | 9.5 | 60 | 80 |

TABLE 3

Experiments 6 to 14

| Experiment | Doping agent (g) | Emulsifier (g)* | Solids (% wt)** | $d_{50}$ (nm) | Runtime (min)*** |
|---|---|---|---|---|---|
| 6 | PPVE-3 (2.37) | 231 (32.4) | 9.5 | 151 | 88 |
| 7 | Flutec PP11 (2.37) | 231 (32.4) | 9.5 | 190 | 81 |
| 8 | PFPHF (2.37) | 231 (32.4) | 9.5 | 219 | 93 |
| 9 | PFPHF (4.76) | 131 (59.5) | 9.5 | 170 | 54 |
| 10 | Flutec PP11 (4.76) | 131 (59.5) | 9.5 | 151 | 55 |

TABLE 3-continued

Experiments 6 to 14

| Experiment | Doping agent (g) | Emulsifier (g)* | Solids (% wt)** | $d_{50}$ (nm) | Runtime (min)*** |
|---|---|---|---|---|---|
| 11 | PFPHF (2.97) | 131 (59.5) | 9.5 | 168 | 49 |
| 12 | HFP-Dimer (4.76) | 131 (59.5) | 9.4 | 149 | 95 |
| 13 | HFP-Trimer (4.76) | 131 (59.5) | 9.4 | 158 | 80 |
| 14 | HTFEE-2 (4.76) | 131 (59.5) | 7.7 | 181 | 72 |

*To these amounts of emulsifier water was added to give a 30% wt aqueous solution.
**% wt based on the total amount of the polymer dispersion
***runtime is the time measured from the beginning of the polymerization until 3.2 kg TFE were consumed (i.e. fed into the reactor, see general polymerization example above).

The invention claimed is:

1. Method of making fluoropolymers by emulsion polymerization of one or more fluorinated monomers in an aqueous phase in the presence of a fluorinated emulsifier, said method comprises adding a doping agent in a weight ratio with respect to the emulsifier of from about 1:2 to about 1:20, said doping agent has a melting point of equal or less than 30° C. and a boiling point of at least about 100° C. and is selected from the group consisting of (iii) fluorinated alkenes of the formula $$F_3C-C(R^d_f)=C(R^e_f)(R^f_f) \quad (II),$$

(iv) fluorinated polyoxyalkanes of the formula $$R^g_f-O-R^h_f-O-R^i_f \quad (III),$$

wherein
$R^d_f$ and $R^e_f$ are independently fluorinated alkyl groups of 1 to 6 C-atoms,
$R^f_f$ is F or a fluorinated alkyl group of 1 to 6 C-atoms,
$R^g_f$ and $R^i_f$ are independently fluorinated alkyl groups of 2 to 5 C-atoms and
$R^h_f$ is a branched perfluorinated alkylene group of 2 to 4 C-atoms.

2. The method according to claim 1, wherein the doping agent has a boiling point between about 100 and about 350° C.

3. The method according to claim 1 wherein the doping agent comprises from 6 to 30 C atoms.

4. The method according to claim 1 wherein the doping agent is a perfluorinated cycloalkane or a perfluorinated arene that is non-substituted or substituted with one or more identical or different perfluoroalkyl or perfluoroalkoxy residues.

5. The method according to claim 1 wherein said fluorinated monomer comprises tetrafluoroethylene, chlorotrifluoroethylene, hexafluoropropylene, vinylidene fluoride and/or perfluoro vinyl ether.

6. The method according to claim 1 wherein the fluoropolymer is polytetrafluoroethylene copolymer comprising more than 84% by weight of polytetrafluoroethylene.

7. The method according to claim 1 wherein the doping agent is added as an aqueous mixture, said mixture comprising at least 10% by weight of the fluorinated emulsifier based on the total weight of emulsifier used in the polymerization.

8. The method according to claim 7 wherein said mixture is added to the aqueous phase prior to or at the start of the polymerization.

9. The method according to claim 1, wherein the doping agent is not telogenic.

10. The method according to claim 1 wherein said fluorinated emulsifier corresponds to the following general formula:

$$Y-Rf-Z-M \quad (IV)$$

wherein Y represents hydrogen, Cl or F; Rf represents a linear or branched perfluorinated alkylene having 4 to 10 carbon atoms; Z represents $COO^-$ or $SO_3^-$ and M represents a monovalent cation.

11. The method according to claim 1 wherein said fluorinated emulsifier corresponds to the general formula $$[R_f-O-L-COO^-]_i X^{i+} \quad (V)$$

wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3.

* * * * *